United States Patent [19]

Diermayer

[11] 4,141,495
[45] Feb. 27, 1979

[54] DRAFT CONTROL ARRANGEMENT FOR COMBUSTION APPARATUS

[76] Inventor: Werner Diermayer, 1275 Panorama Dr., Lafayette, Calif. 94549

[21] Appl. No.: 802,678

[22] Filed: Jun. 2, 1977

[51] Int. Cl.² .......................... F23L 3/00; G05D 23/08
[52] U.S. Cl. ................................ 236/1 G; 236/93 R; 236/101 B
[58] Field of Search ............... 236/1 G, 101 B, 101 E, 236/93 R; 431/22, 20; 126/285 B; 110/163

[56] References Cited
U.S. PATENT DOCUMENTS

| | | | |
|---|---|---|---|
| 3,134,377 | 5/1964 | Kawoy | 236/93 UX |
| 3,510,059 | 5/1970 | Diermayer et al. | 236/93 |

*Primary Examiner*—William E. Wayner
*Attorney, Agent, or Firm*—Flehr, Hohbach, Test, Albritton & Herbert

[57] ABSTRACT

The combustion gases of a burner in a heating furnace are discharged to a vent through a draft hood having three ports. The first and second ports communicate with the furnace and the vent respectively and define a first flow path for combustion gases through the chamber of the hood. The third port is open to the ambient atmosphere and defines a second flow path for dilution air through the chamber. Separate temperature responsive, bimetallic elements sense the temperatures in the two paths and cause a vent damper to be moved toward and away from a position in which it closes the second port in response to the sensed temperatures to minimize the flow of dilution air. In a modified embodiment the draft hood is vertically elongate with the bimetallic elements positioned in a zone filling with hot products of combustion for minimizing the flow of dilution air and minimizing spillage of products of combustion during start-up and sudden changes in draft.

15 Claims, 10 Drawing Figures

DRAFT CONTROL ARRANGEMENT FOR COMBUSTION APPARATUS

BACKGROUND OF THE INVENTION

Gas-fired natural draft appliances, such as the typical water heaters and furnaces in American homes, are equipped with a draft hood which protects the combustion process from excess draft and from backdraft. Excess draft in the vent draws ambient air through the draft hood. In case of backdraft or no draft conditions the flue gases flow from the heat exchanger through the draft hood out of the appliance. Without a draft hood a backdraft would cause incomplete combustion (excessive $CO_2$ and CO) and might blow out the flame.

If the appliance is installed in a home and draws conditioned air for combustion the vent acts like an open window during the standby periods, allowing warm room air to escape, or cold outside air to enter. Automatic vent dampers reduce this loss by closing the vent during the standby periods of the heating cycle.

Thermally controlled vent dampers have been used for this purpose for many years. They operate by sensing the temperature prevailing in the damper. In addition to their primary job of closing the vent during standby they adjust the vent opening during the operation of the appliance by flexing to a partially closed position if the bimetallic elements are cooled by a large amount of dilution air aspirated through the draft hood. This modulating function of thermally controlled vent dampers reduces heat loss during the operating period of the heating cycle.

While known designs of thermally controlled vent dampers reduce excessive dilution air to a varying degree they cannot optimize this function since they sense the temperature in the vent connector. At that point the vent gases constitute a mixture of the flue gases coming from the heat exchanger and the dilution air coming through the draft hood. The temperature of the flue gases varies widely from one appliance to the other and even in the same appliance during one heating cycle. The automatic adjustment of the amount of excess dilution air (and thereby the reduction of heat loss) to a practical minimum by sensing only the temperature of the flue gas/air mixture is therefore an approximation.

OBJECT AND SUMMARY OF THE INVENTION

It is a primary object of this invention to provide a new and improved draft control arrangement for combustion apparatus.

Another object is to provide a draft control arrangement incorporating a draft hood which operates in a manner to hold to a minimum the inherently wasteful flow of conditioned dilution air through the draft hood into the vent.

The invention in summary provides a draft control arrangement for a combustion apparatus which includes a draft hood bounding a chamber and formed with first, second, and third ports spaced from each other. A first flow path through the chamber is defined by the first and second ports, and a second flow path by the second and third ports. A first connector communicates with the first port for admitting combustion gases to the chamber. A second connector communicates with the second port for venting the chamber to a vent. The third port is open to the ambient atmosphere for admitting air to the chamber. A vent damper is mounted in the chamber for movement toward and away from a position in which the damper assembly essentially closes the second port. First and second temperature sensing devices are respectively associated with the first and second flow paths for sensing the temperatures in the associated flow paths. A damper actuating mechanism connects the vent damper assembly to the sensing devices and responds to the sensing of rising or falling temperatures by either one of the sensing devices for moving the vent damper away from or toward that position thereof.

Other features, additional objects, and many of the attendant advantages of this invention will readily be appreciated as the same becomes better understood by reference to the following detailed description of the preferred embodiments when considered in connection with the appended drawing in which:

DESCRIPTION OF THE PREFERRED EMBODIMENT

Figure 1:
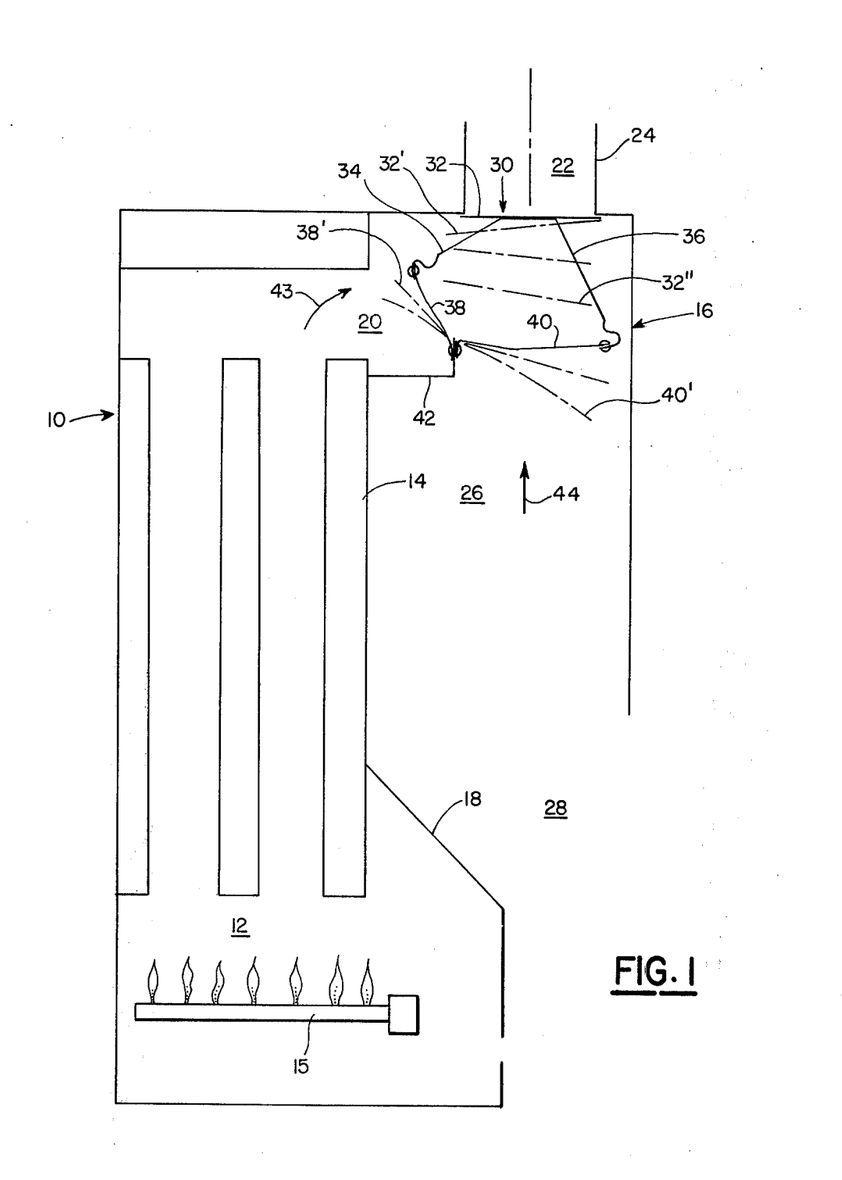
FIG. 1 is a vertical section view of a gas-fired combustion apparatus incorporating a draft control arrangement of the invention.

Referring initially to FIG. 1, there is shown a combustion apparatus 10 comprising a domestic heating furnace which incorporates the invention. The walls of the apparatus enclose a combustion space 12 and a heat exchanger 14. A conventional gas burner 15 is arranged under the heat exchanger 14 so that the combustion products of the burning gas heat the air flowing through heat exchanger 14 which functions as a heat transfer medium for room heating.

A draft hood 16 is provided and is separated from the heat exchanger by a sheet metal wall 18. A first port 20 defines a flow path from the combustion space into the upper portion of the draft hood. A second port 22 in the top wall of the hood 16 leads to a vent 24. The draft hood encloses a chamber 26 which communicates with the ambient atmosphere through a continuously open third port 28.

In the illustrated, non-operative mode of the furnace, a vent damper 30 blocks the port 22. The vent damper 30 comprises a flat sheet-metal plate 32 from which narrow leaf springs 34, 36 depend. The ends of the leaf springs remote from the plate are S-shaped for greater flexibility and are fastened to respective first ends of bimetal strips 38, 40. The other ends of the bimetal strips are fixedly fastened to a bracket 42 in the chamber 30.

The bimetal strips 38 are located in a flow path 43 of combustion gases from the combustion zone through the port 20 into the chamber 26. Heating of the strips 38 by the hot gases causes the strips to flex so as to swing counterclockwise (as viewed in FIG. 1) about the bracket 42 into the position indicated by broken line at 38'. The damper plate is moved thereby into a correspondingly indicated position 32' to permit escape of the combustion gases through the port 22 into vent 24. The thermal up-draft in the vent draws a small amount of ambient air through the third port 28 into another flow path 44 to second port 22. The bimetal strips 40 are located in the flow path 44 and as long as the strips 40 are adequately cooled by the air stream they do not change their curvature, nor do they affect the position of the plate 32.

If the draft in the vent 24 is insufficient for drawing all of the combustion gases through the partly closed port 22, then hot gases accumulate along a flow path leading from port 20 to the port 28 and heat the bimetal strips 40. The strips 40 then flex and swing clockwise (as viewed in FIG. 1) about bracket 42 to position 40'. This causes the damper plate to fully retract from port 22 to position 32" and thereby increase the gas flow into vent 24. When the hot gases near the strips 40 are replaced by cooler diluting air drawn into port 28 by the draft in the vent these strips flatten and move plate 32 back toward position 32'.

The dimensions and thermal responses of the strips 38, 40 are readily selected to minimize the flow of dilution air in each combustion unit. Unnecessary loss of heated or otherwise tempered inside air through the vent 24 is avoided. The temperature of the combustion gases and their amount may be varied by adjusting the gas supply and the air supply to the burner in a conventional manner, but varying combustion conditions in the space 12 do not affect the control of the diluting air by the bimetal strips.

The bimetal strips in the specific embodiment of the apparatus shown in FIG. 1 are selected to move the plate 32 toward closure of the port 22 when their temperatures fall below about 150° F., and to move the plate away from the port at higher temperatures.

The leaf springs 34, 36 provide yieldably resilient connections between the bimetal elements and the plate 32. They avoid the damage to the bimetal strips and the damper plate that might otherwise result from excessive pressure exerted by the bimetal strips at extremely low temperatures. They also permit the draft control arrangement to be built without hinges, bearings, shafts, or other elements subjected to friction during use, and which would otherwise require periodic lubricating or other maintenance. No external power supply is needed. All connections between the bimetal strips, the leaf springs, the damper plate, and the bracket 42 are fixed, and preferably riveted.

Figure 2:
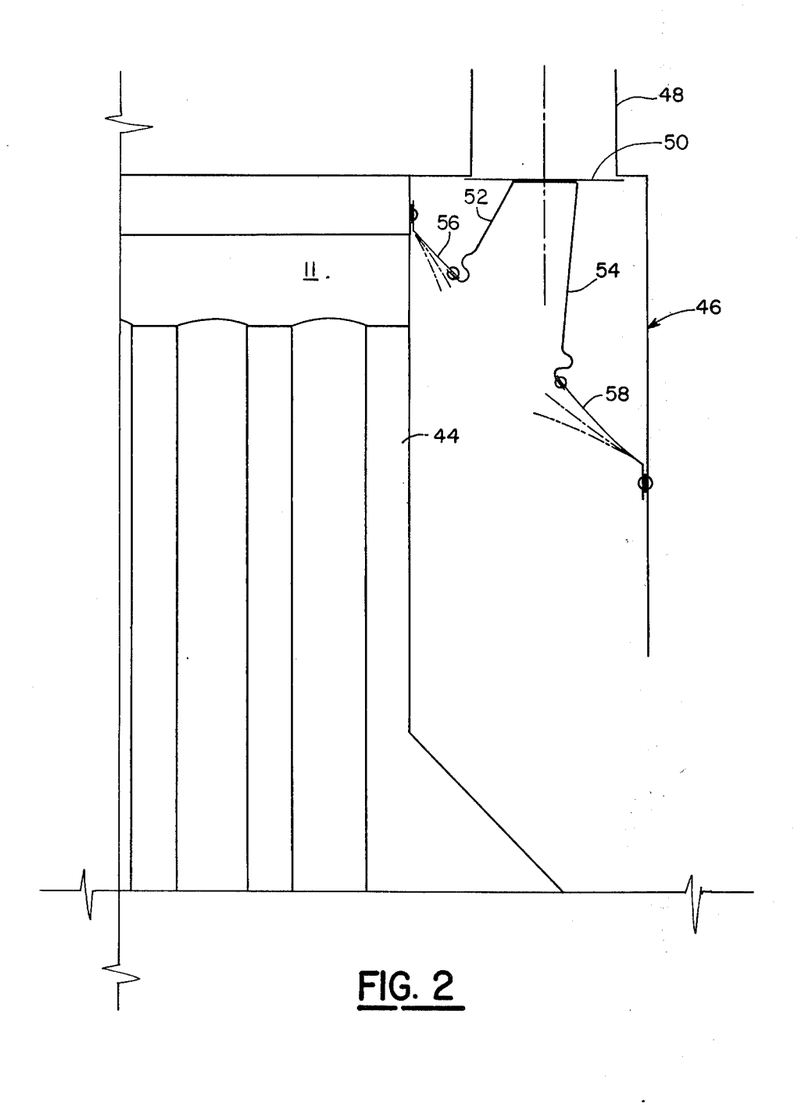
FIG. 2 is a vertical section view of another embodiment of the invention.

FIG. 2 illustrates another embodiment providing a draft control arrangement for a furnace having a heat exchanger 44 and a draft hood 46 and vent 48 similar to the structure described for FIG. 1. A damper plate 50 is carried by leaf springs 52, 54 which in turn are mounted on respective bimetal strips 56, 58.

The damper assembly shown in FIG. 2 may be assembled in a suitably shaped frame to facilitate installation in existing draft hoods as a unit.

Figure 3:
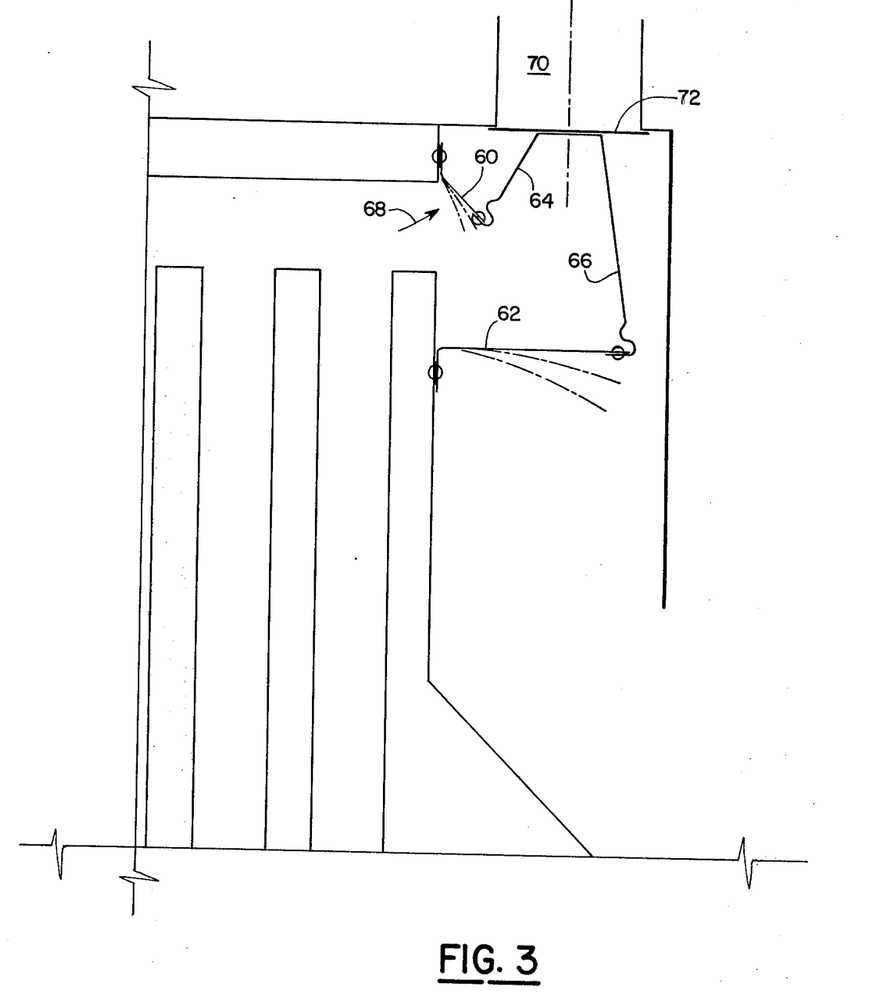
FIG. 3 is a vertical section view of another embodiment.

Another embodiment of the invention shown in FIG. 3 is similar to the structure of FIGS. 1 and 2 and includes bimetal strips 60, 62 which extend in approximately right angle directions from the associated leaf springs 64, 66. The bimetal strips are mounted so that the strips 60 extend across a flow path 68 from the furnace to the port 70 which is closed by damper plate 72. The strips 62 are located well below the port 70, and the mode of operation is similar to that described for the embodiment of FIG. 1.

Figure 4:
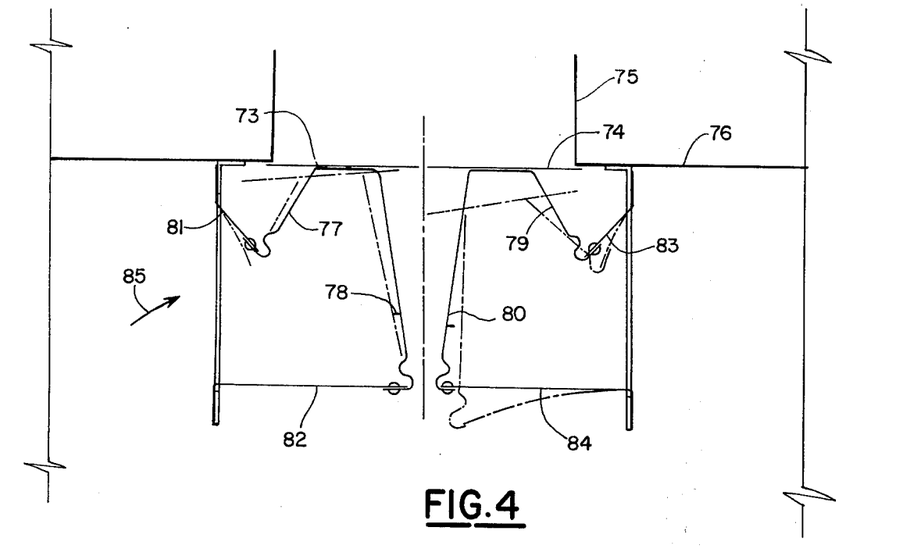
FIG. 4 is a partial vertical front section view of another embodiment.
Figure 5:
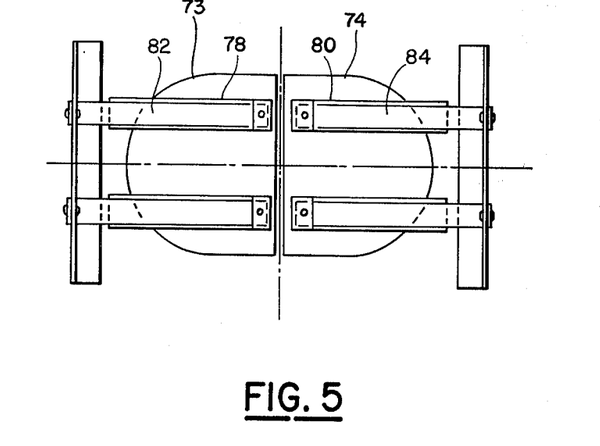
FIG. 5 is a bottom plan view of the embodiment of FIG. 4.

FIGS. 4 and 5 illustrate another embodiment of the invention with only the top portion of a typical draft hood being shown in frontal elevation with the front plate of the draft hood removed for clarity. A damper comprising two half-plates 73, 74 is mounted below a vent 75 within the draft hood 76. Each half-plate is carried by respective pairs of leaf springs 77, 78 and 79, 80. The leaf springs of half-plate 73 are connected to upper and lower bimetal strips 81, 82 while the leaf springs of the other half-plate 74 are connected to another pair of upper and lower bimetal strips 83, 84. In operation, the upper bimetal strips 81 and 83 respond to the flow of combustion gases while the lower bimetal strips 82 and 84 respond to either the relatively cold dilution air by moving dampers 73 and 74 toward the vent port or to the heat of the combustion gases if they accumulate in the draft hood by moving damper half-blades 73 and 74 away from the vent port, thereby minimizing the flow of dilution air. The operation is similar to that described for the embodiment of FIG. 1.

Figure 6:
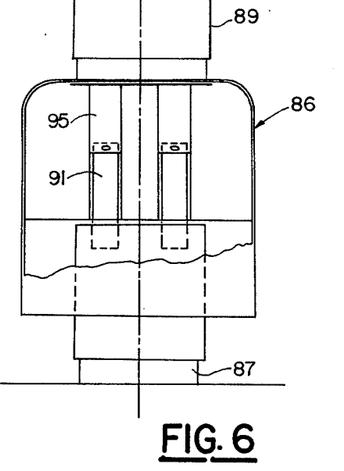
FIG. 6 is an end view, partially broken away, of another embodiment.
Figure 7:
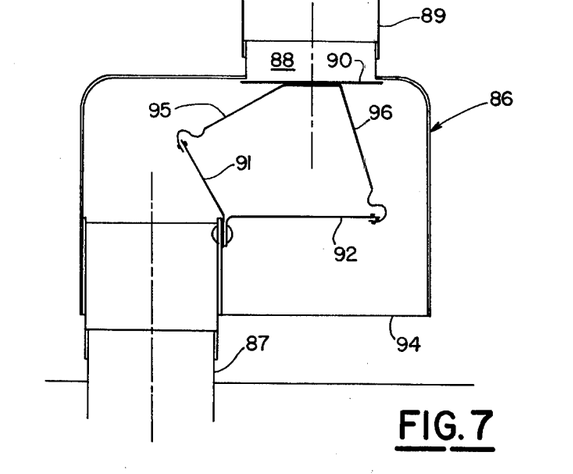
FIG. 7 is a vertical section of the embodiment of FIG. 6.

FIGS. 6 and 7 illustrate another embodiment adapted for use with a typical water heater. A draft hood 86 is mounted above a flue pipe 87 leading from the water heater, and the port 88 in a vent 89 above the hood is opened and closed by a damper plate 90. The damper plate is controlled by three or more bimetal strips, with one or more strips 91 mounted to extend in the flow path of flue gases from the heater, and two or more strips 92, projecting in the flow path leading from the open lower end 94 of the hood toward vent port 88. Leaf springs 95, 96 connect the respective bimetal strips with the damper plate. The operation of the embodiment of FIGS. 6 and 7 is similar to that described for the embodiment for FIG. 1.

Figure 8:
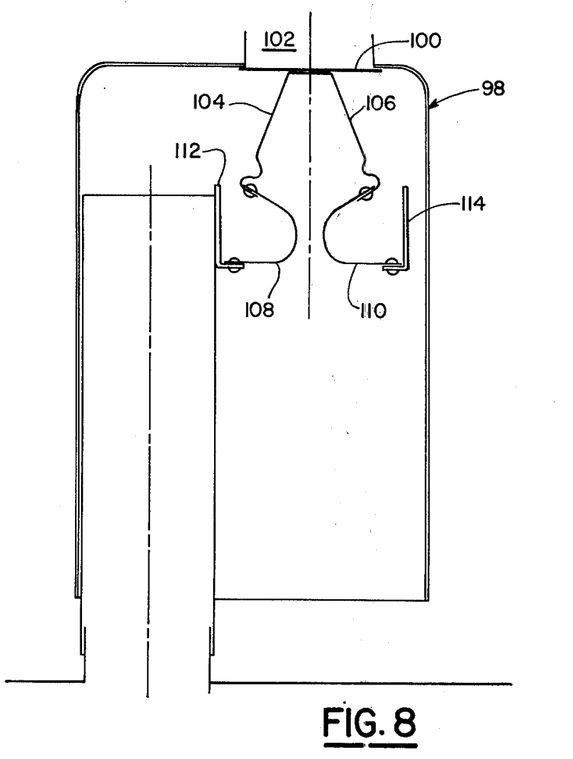
FIG. 8 is a vertical section of another embodiment.

FIG. 8 illustrates another embodiment providing a draft control arrangement incorporating a vertically elongate draft hood 98. A damper 100 closes vent port 102 and is carried on leaf springs 104, 106 which in turn are carried on one or more pairs of bimetal strips 108, 110 mounted on brackets 112, 114 within the hood.

In heating appliances equipped with natural draft burners some spillage of products of combustion may occur at the draft hood relief opening during start-up and when the draft changes suddenly, especially in installations with short vent systems. If such an appliance is equipped with a conventional thermally controlled vent damper then spillage may occur during start up even under normal draft conditions. The embodiment of FIG. 8 minimizes both spillage and flow of dilution air by a combination of: (a) the vertically elongated draft hood, which allows more accumulation of the flue gases before spillage and thereby more time for the bimetal elements to react and to open the damper further, and (b) the thermally controlled vent damper having its heat sensing element located in a portion of the draft hood which becomes filled with hot products of combustion if the draft decreases or becomes filled with relatively cool ambient air if the draft increases.

Figure 9:
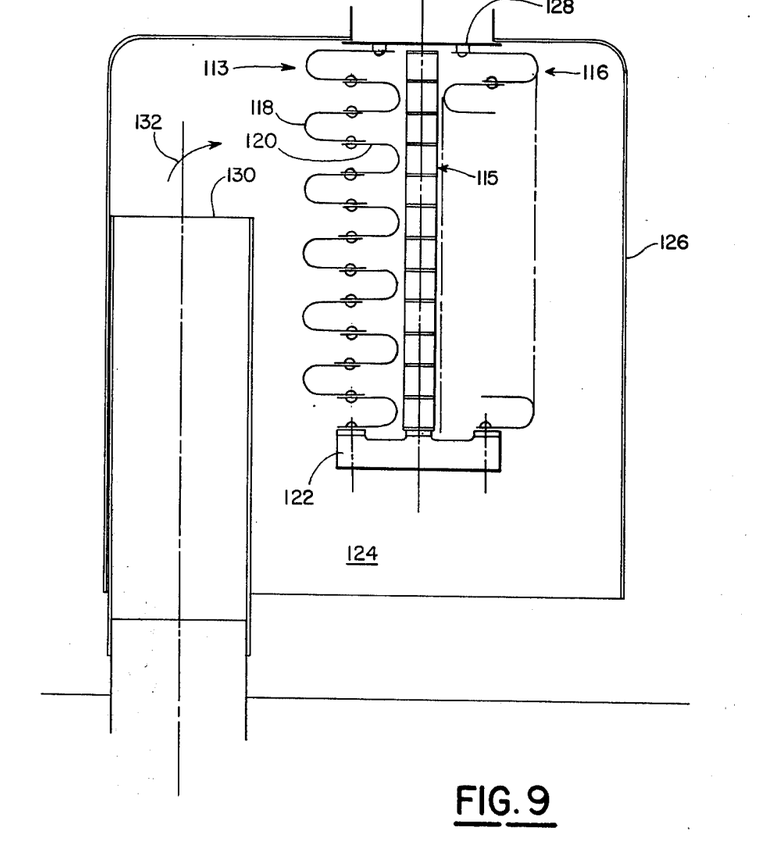
FIG. 9 is a vertical section of another embodiment.

Another embodiment of the invention is illustrated in FIG. 9 and includes four stacks 113, 115, 116, (only three of which are illustrated) with each stack comprising a plurality, shown as twelve, of generally U-shaped bimetal strips 118, 120. The stacks extend upward from a bracket 122 which is fixedly mounted in the chamber 124 of an elongate draft hood 126 similar to that described for the embodiment of FIG. 8. The bimetal strips are riveted or otherwise fixedly fastened together in each stack in such a manner as to extend from the bracket 122 to a damper plate 128 which is riveted to the four topmost bimetal strips. The use of bimetal stacks is a known method for achieving large linear thermal expansion and contraction of the temperature-sensitive unit.

The two or more longitudinal layers of metals having different coefficients of thermal expansion are combined in each strip 118, 120 in such a manner that the legs of the U-shape move toward each other as the temperature rises. The bimetal strips above the port 130 thus contract primarily in response to the flow of hot combustion gases along path 132 while the bimetal strips below the level of port 130 provide the desired independent control of the diluting air.

Figure 10:
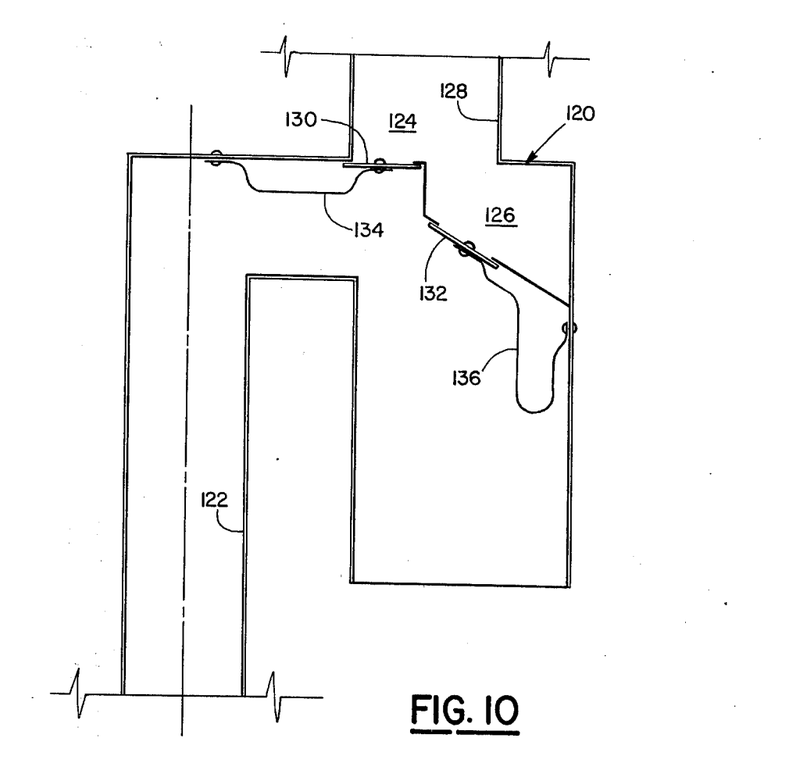
FIG. 10 is a vertical section of another embodiment.

The U-shaped strips 118, 120 are resilient enough to assume the functions of the leaf springs in the draft control arrangement shown in FIG. 2. Another embodiment of the invention is illustrated in FIG. 10. A draft hood 120 is mounted above a flue pipe 122 leading from a heating appliance, and ports 124 and 126 in vent 128 are opened and closed by damper sections 130 and 132. Damper section 130 is actuated by one or more bimetal elements 134 responding to the hot combustion gases flowing through flue pipe 122 and draft hood 120 into vent 128. Damper section 132 is actuated by one or more bimetal elements 136 responding to either the relatively cold dilution air by moving the damper section toward the vent port or to the heat of the combustion gases if they accumulate in the draft hood by moving the damper section away from the vent port, thereby minimizing the flow of dilution air.

Many variations are possible in the draft control arrangement of the invention without affecting its desired operation. The draft hoods shown in FIGS. 1 through 5 are of a type commonly used in domestic heating furnaces. Draft hoods on gas-fired water heaters generally may have the form shown in FIGS. 6 and 7. A port leading to a vent need not be installed in the top wall of a draft hood, as is well known. Yet, the invention is applicable to the various modified draft hoods as long as the temperatures of the combustion gases (or of a gas mixture predominantly consisting of combustion gases) and the temperature of the diluting air (or of a gas mixture predominantly consisting of diluting air) is sensed separately, and with a damper plate moved accordingly toward and away from the position in which it occludes the port to the vent, or where the heat sensing elements are installed in an area within the draft hood which becomes filled with hot products of combustion if the draft decreases and becomes filled with relatively cool ambient air if the draft increases.

The leaf springs and bimetal strips described above are generally quite narrow so as not to interfere with gas flow through the hood chambers. For adequate stability of the damper plates, it is preferred to provide at least three leaf springs and three bimetal strips. If at least one relatively wide spring and a corresponding strip are acceptable, a total of two strips and two springs may be adequate. More than four springs and strips, of course, are permissible.

Bimetal strips are the least expensive temperature sensing elements available at this time, but other temperature sensing elements may be employed in conjunction with actuating elements such as the described leaf springs, or the sensing elements themselves may function as direct actuating elements in the manner shown in FIG. 9.

Other variations of the illustrative embodiments of the invention described above will readily suggest themselves to those skilled in the art. It should be understood, therefore, that the foregoing disclosure relates only to presently preferred combustion apparatus and to draft control arrangements for such apparatus, and that it is intended to cover all changes and modifications of the examples of the invention chosen herein for the purpose of the disclosure which do not depart from the spirit and scope of the invention set forth in the appended claims.

What is claimed is:

1. A method for controlling the flow of gases in combustion apparatus including the steps of directing combustion gases along a first flow path from the apparatus toward a vent, positioning a draft control member in the vent for controlling gas flow in one path from the combustion apparatus and in another path through a draft hood from the surrounding atmosphere, sensing the temperature of gases within the draft hood, and moving the vent control means to and from said vent responsive to the temperature of the gases sensed within the draft hood to minimize the amount of dilution air which flows from the atmosphere through the draft hood.

2. A method as in claim 1 in which the temperature of combustion gases within the first path is sensed, and the temperature of gases in the second path is separately sensed, and the vent control means is moved to and from the vent in response to simultaneous sensing of the temperatures in the first and second paths.

3. A method as in claim 2 in which a first bimetallic element is positioned within the first path and changes shape in response to temperature of the gases therein, a second bimetallic element is positioned within the second path and changes shape in response to temperature of the gases therein, a first portion of the vent control means is moved to and from the vent responsive to change of shape of the first bimetallic element, and a second portion of the vent control means is moved to and from the vent responsive to change of shape of the second bimetallic element.

4. A method as in claim 1 in which the vent control means is moved from the vent to open flow therethrough responsive to the sensing of an increase in temperature within the draft hood when hot flue gases from the combustion apparatus accumulate within the draft hood, and the vent control means is moved toward the vent for limiting flow therethrough responsive to a reduction in temperature within the draft hood during either non-operating periods or when more than minimal amounts of dilution air enter the draft hood.

5. A draft control arrangement for combustion apparatus having a first port for exhausting combustion gases toward a vent port and having a draft hood having an inlet port for directing ambient air through the hood toward the vent port, including the combination of a damper mounted for movement to and from the vent port for controlling gas flow therethrough, temperature sensing means mounted in the flow of air leading to the vent port within the hood, said temperature sensing means being coupled with the damper and being operable to move the damper from the vent port responsive to an increase in the temperature of the gases which are sensed whereby the excess volume of combustion gases is removed, said temperature sensing means further operating to move the damper toward the vent port responsive to a decrease in temperature of the gases which are sensed for decreasing the amount of dilution air drawn through the inlet port.

6. A draft control arrangement as in claim 5 in which the temperature sensing means includes a first temperature sensing element disposed in a first path of gases leading from the first port toward the vent port, a second temperature sensing element disposed in a second path of gases from the inlet port through the draft hood toward the vent port, and means for coupling the first and second temperature sensing elements with the damper whereby the damper is moved to and from the vent port responsive to conjoint sensing of temperatures of gases in the first and second paths.

7. A draft control arrangement as in claim 6 in which the first and second sensing elements are constructed to change shape responsive to a change in temperature, and means for coupling the first sensing element with a portion of the damper for moving the latter responsive to a change in shape of the first sensing element, and means for coupling the second sensing element with a second portion of the damper for moving the latter responsive to a change in shape of the second sensing element.

8. A draft control arrangement as in claim 7 in which the damper comprises at least a pair of first and second sections which are independently moveable toward and away from the vent port, said first damper section being coupled for movement with the first temperature sensing element and the second damper section being coupled for movement with the second temperature sensing element.

9. In a heating system having a combustion apparatus which discharges hot combustion gases, the combination of a draft hood defining a chamber, vent means in an upper portion of the draft hood, means for directing the hot gases along a first path toward the vent means, means for directing dilution air into a lower portion of the draft hood along a second path toward the vent means, a damper for controlling the flow of gases through the vent means, and actuating means for sensing the temperature of gases within a portion of the chamber and responding thereto for moving the damper to and from the vent means to minimize the amount of dilution air flowing into the draft hood.

10. A heating system as in claim 9 in which the actuating means is positioned in a portion of the draft hood which becomes filled with the hot gases when the draft through the vent means becomes sluggish whereby the actuating means responds thereto for moving the damper from the vent means, said actuating means also being positioned in the flow of dilution air which increases when the draft through the vent means become stronger and responds thereto for moving the damper toward the vent means.

11. A heating system as in claim 9 in which the actuating means includes heat sensing elements which extend vertically in a portion of the draft hood and are surrounded at their top portion by the hot flue gases and at their lower portion by relatively cold dilution air, said sensing elements being adapted to vertically contract and expand responsive to respective decrease and increase in temperature of the surrounding gases for moving the damper relative to the vent means.

12. A heating system as in claim 9 in which the actuating means includes a bendable sensing element which bends and changes curvature in response to a change in temperature, with one end of the sensing element being coupled with a portion of the damper whereby a change in curvature of the sensing element moves the damper portion.

13. A heating system as in claim 12 which includes resilient connecting means for coupling the sensing element with the damper whereby movement of the damper by the sensing element is accomplished without the requirement for friction surfaces.

14. A heating system as in claim 9 in which the actuating means includes a first temperature sensing and responsive element positioned in the path of gases flowing from the flue to the vent means, a second temperature sensing and responsive element positioned within the draft hood in the path of dilution air flowing to the vent means, and means for coupling the first and second sensing elements with the damper.

15. A heating system as in claim 14 in which the damper comprises first and second portions each of which is independently moveable toward and away from the vent means, and means for coupling the first and second damper portions for movement with respective first and second sensing elements.

* * * * *